May 27, 1958  E. S. ROBBINS  2,835,923
CURING BAG DRAINER ASSEMBLY
Filed June 26, 1956  2 Sheets-Sheet 1

INVENTOR.
EDWARD STANLEY ROBBINS
BY Frank E. Robbins Jr.
ATTORNEY

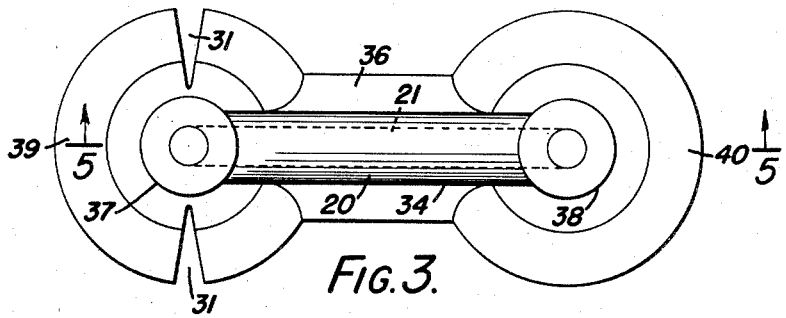
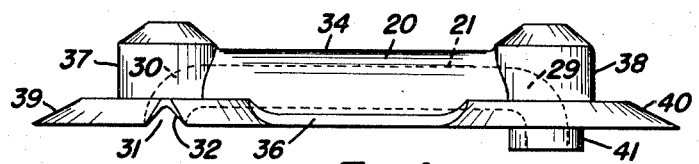
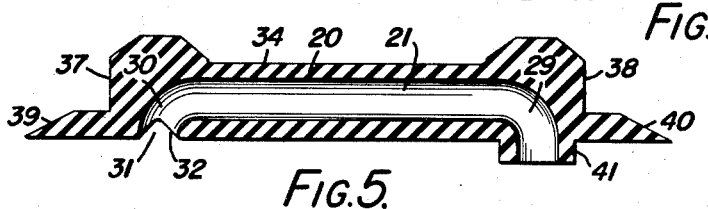
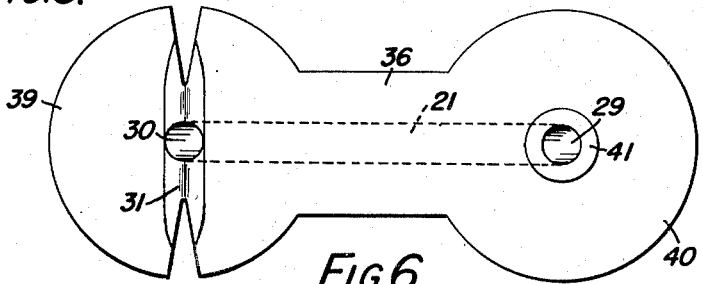
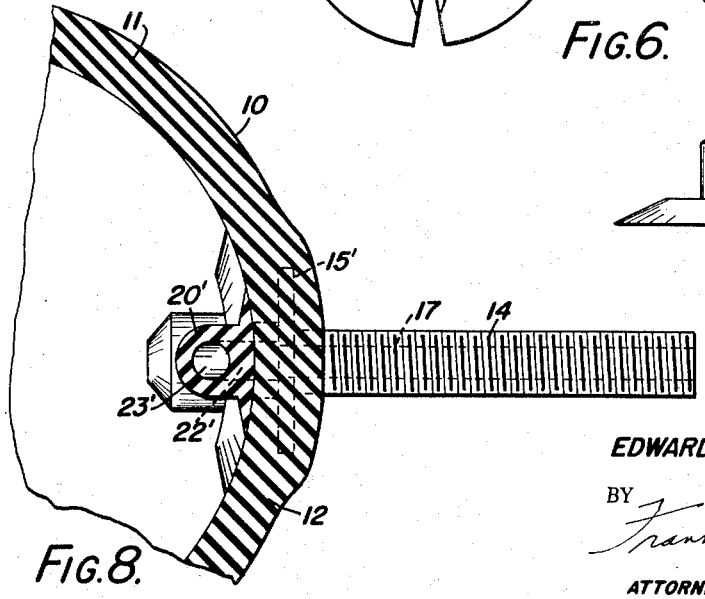

United States Patent Office 2,835,923
Patented May 27, 1958

2,835,923

CURING BAG DRAINER ASSEMBLY

Edward Stanley Robbins, Killen, Ala., assignor, by mesne assignments, to Robbins Tire and Rubber Company, Inc., Tuscumbia, Ala., a corporation of Alabama Application June 26, 1956, Serial No. 593,933

5 Claims. (Cl. 18—45)

This invention relates to an improved curing bag for use in expanding a tire within a vulcanizing mold. More specifically, the invention relates to a curing bag having an improved draining means. Although the improved curing bag disclosed and claimed in this application may be employed in connection with many types of vulcanizing molds, the improved curing bag is particularly designed for use in connection with retreading or recapping molds.

In a conventional recapping operation, the tread rubber is removed from a tire by buffing. Camelback is then adhered in place, and a curing bag is inserted in the tire. After the curing bag is in position, a sturdy metal rim is placed within the tire, abutting against the curing bag. The air valve stem of the curing bag projects through an aperture in the rim. The tire is then placed in a mold, the mold is closed, compressed air is injected into the curing bag, and heat is applied to the mold. Curing or vulcanizing usually requires about an hour. During this time, the curing bag is subjected to high temperature and high pressure. Under these conditions, the normal life of a curing bag is limited to about 50 to 75 vulcanizations.

In the manufacture of pneumatic tires, hot water, steam, glycerine, and air, either alone or in some combination, have been employed as the fluid which is forced into the curing bag under pressure. However, in the ordinary recapping shop, where operations are on a relatively small scale and equipment is limited, compressed air has been used almost exclusively as the inflating fluid.

The advantages of using steam as the inflating fluid for recapping have been appreciated. These include more rapid curing because of the heat gain from the steam itself, in contrast with the customary heat loss through compressed air; shortened complete cycle time, because of more rapid curing, with consequent cost savings through more efficient use of the mold; and an expectation of longer life for the curing bag, because of the beneficial effects of steam in contact with the bag. Until the present invention, there has been no practical method by which use could be made of these advantageous characteristics of steam.

Generally, a recapping shop has a steam boiler, but it is a low pressure boiler for heating the molds. While all steam condenses in the curing bag to some extent, low pressure steam condenses more rapidly than high pressure steam. The condensate causes cold spots in the curing bag and tire carcass, and results in an imperfect cure. Various schemes and devices have been tried in an attempt to remove condensate from the curing bag, but without sufficient success to induce industry adoption. Generally, such schemes or devices have involved complex mechanisms, which are costly and are unsuited for use by the labor available.

An object of the present invention is to provide an improved curing bag especially suitable for use with steam in recapping or retreading, characterized by ease of manufacture and relatively long life during use.

Another object of the invention is to provide an improved curing bag for use with a pneumatic tire in a vulcanizing mold in which steam may be employed as the compressed fluid to expand the curing bag, where the bag includes means for the rapid, safe, and simple removal of any condensate.

A still further object of the invention is to provide an improved curing bag having a draining means which is integrally and permanently secured to the inner surface of the curing bag, simple to manufacture, and easy to use.

These and other objects of the invention are accomplished by providing a molded rubber, synthetic rubber, or vulcanizable synthetic plastic drain tube which may be permanently secured along its entire length to the inner surface of the curing bag, transversely thereof. The inlet to this drain tube is desirably positioned at the lowermost point of the curing bag during usage of the bag. The discharge end of the drain tube interconnects with a conventional valve stem which provides a passageway through the wall of the bag. Since the tube is permanently fixed in position, through vulcanization to the curing bag itself, the drain tube becomes an integral part of the curing bag. The drain assembly for the curing bag thus is extremely simple, has no parts which need adjustment, repair, or care in positioning. The drain valve stem may be connected directly to a steam trap so that any water condensate will be immediately discharged from the curing bag and tube, while the hot air or steam in the curing bag will remain confined.

A somewhat similar fluid inlet assembly may be employed. The discharge end of the fluid inlet tube is desirably free and open. The entire length of the tube is circumferentially directed along the inner surface of the curing bag, and is permanently secured thereto. The direction of fluid inlet is away from the drain tube, so that a proper circulation of fluid within the curing bag is provided.

Further structural details of the invention may be best understood by reference to the following detailed description, considered together with the accompanying drawings, in which:

Fig. 3 is a top plan view of a drain tube;

Fig. 4 is a side elevation of a drain tube;

Fig. 5 is a section taken on line 5—5 of Fig. 3;

Fig. 6 is a bottom plan view of a drain tube;

Fig. 7 is an end view of a drain tube; and

Fig. 8 is a section taken on line 8—8 of Fig. 1.

Figure 1:
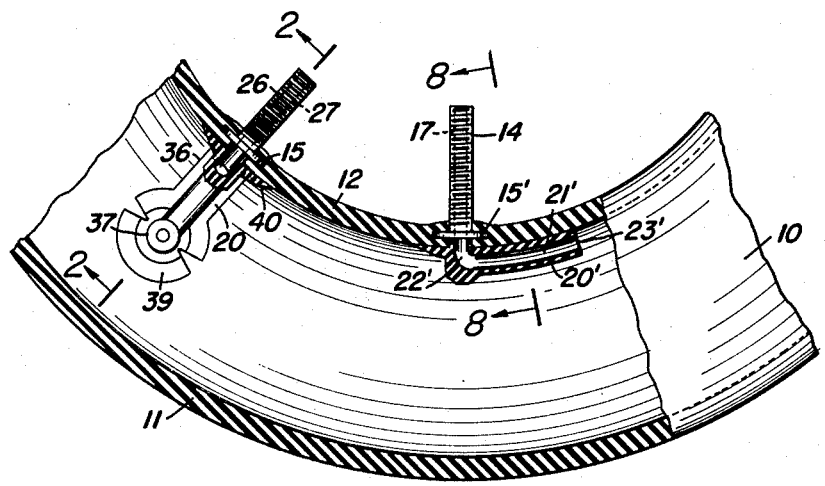
Fig. 1 is a partial plan view, in section, of a curing bag incorporating a draining device and fluid inlet tube according to the present invention.

Referring now to the drawings, and in particular to Fig. 1, the curing bag 10 is a conventional annular toroidal inflatable tube, somewhat similar to the ordinary inner tube, but having a much greater wall thickness. This curing bag is used in its conventional way, for insertion within a tire, when the tire is placed in a vulcanizing mold. The curing bag 10 is of an extensible, resilient material. A preferred material is synthetic rubber, which is highly resistant to the deleterious effects of repeated exposure to high vulcanizing temperatures at high pressures. Butyl rubber is a very good material, because of its desirable characteristics upon repeated exposure to high temperatures.

The outer wall 11 of the curing bag is so shaped as to conform to the inner surface of a tire, and under pressure, urge it against the mold. The inner or rim wall 12 is of the same heavy thickness as the outer wall 11, and is so shaped as to maintain the beads of the tire in which it is inserted in contact with the tire mold during the vulcanizing operation.

In a preferred embodiment of the invention, separate means are provided for inflating and discharging the tube. Thus, there is provided an inlet stem 14 extending to the interior of the curing bag, which is secured to the inner or rim wall 12 of the bag in the conventional manner by a metallic disk 15', which is sandwiched between covering layers of the rim wall 12, and is vulcanized thereto. On the interior surface of the curing bag, there is disposed a molded rubber tube 20', having a passageway 21' therethrough aligned with the bore 17 of the inlet stem 14. The passageway 21' of the fluid inlet tube 25 includes a rather short tube inlet opening 22', radially disposed with respect to said curing bag, and axially aligned with the bore 17 of the valve stem 14. The passageway 21' through the fluid inlet tube 20' extends along the entire length of the fluid inlet tube and connects directly into the inlet opening 22'. The fluid inlet tube is secured along its length circumferentially with respect to the curing bag, and the discharge end is simply the open end of the inlet tube. The fluid inlet tube 20' discharges into the curing bag through its discharge outlet 23', in a direction away from the drain assembly.

Figure 2:
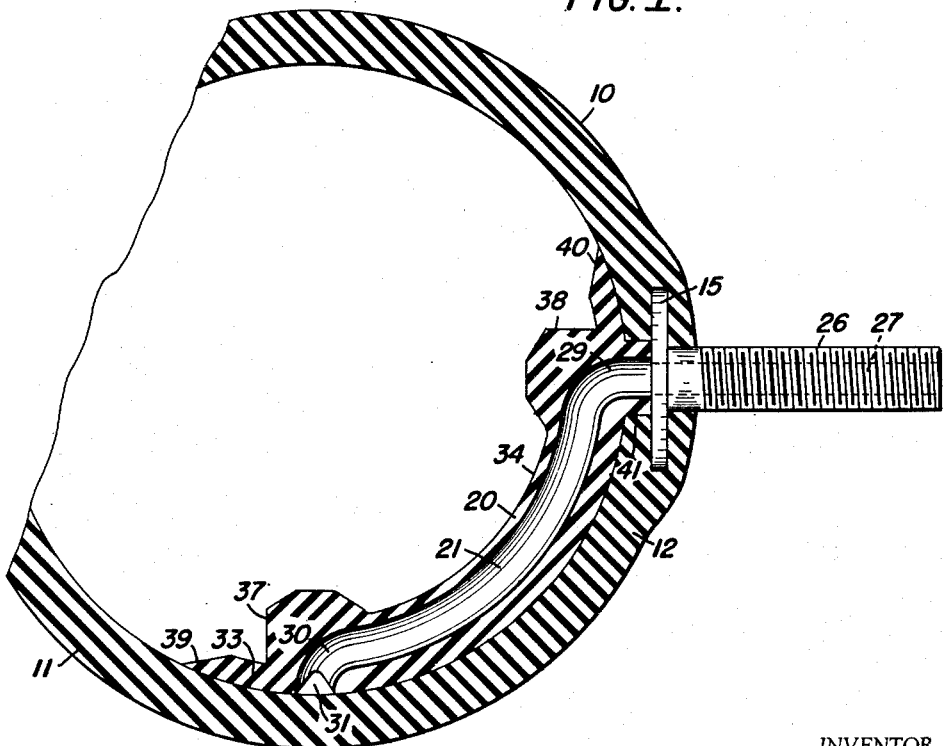
Fig. 2 is a sectional view of a drain tube secured in a curing bag, taken on line 2—2 of Fig. 1.

The drain assembly similarly consists of a discharge stem 26, with a bore 27 extending to the interior of the curing bag. The discharge stem 26 is also secured to the walls of the curing bag through a conventional grommet 15, which is vulcanized within the rim wall 12. A drain tube 20 is secured over its entire length to the inner surface of the curing bag, with a passageway 21 therethrough interconnecting with the bore 27 of the discharge stem 26. The passageway 21 includes a discharge opening 29 (Fig. 2) which is radially disposed with respect to the curing bag 10, and which is axially aligned with the bore 27 of the stem 26 of the discharge valve. The main passageway 21 of the tube runs lengthwise of the tube and opens directly into the discharge opening 29. At the opposite extremity of the tube, there is disposed an inlet opening 30, which is also radially disposed with respect to the curing bag, and which opens into the main passageway 21 of the tube.

The drain tube 20 is desirably manufactured as a molded rubber article, and is vulcanized or partially vulcanized prior to the time it is secured in the curing bag. In order to provide unobstructed access to the inlet opening of the drain tube 20, a channel 31 is formed across the undersurface of the inlet opening 30, in a direction transverse to the length of the tube 20, so that the channel 31 may be directed circumferentially with respect to the curing bag. Thus, the walls 32 of the inlet opening are disposed above the underlying surface 33 of the curing bag.

The drain tube 20 consists of a lengthwise passageway 21 enclosed within thick tubular walls 34. At each end of the drain tube 20 the tubular walls 34 extend gradually into small cylinders 37 and 38 respectively. Each of these cylinders 37 and 38 is disposed with its axis at right angles to the length of the tube. The cylinders 37 and 38 are slightly larger in outer diameter than the tubular walls 34, since additional strength is usually required to withstand the pressure exerted on the tube at these points. Extending tangentially outward from the undersurface of the tube there is a relatively thin flange 36, having a substantially flat undersurface, and gradually decreasing in thickness in a direction outwardly from the tube. Immediately adjacent the cylinders 37 and 38 respectively, the flange 36 flares outwardly and assumes the form of a pair of discs 39 and 40, respectively. The drain tube inlet channel 31 extends transversely of the tube entirely across the width of the disc 39 surrounding the inlet opening 30.

The length of the drain tube may be varied to accommodate curing bags of different sizes. The tube is flexible, and before the tube is secured in position on the curing bag, it is bent so as to conform to the normal shape of the curing bag. Since it is generally most convenient to form the drain tube by molding it as a separate article, and vulcanizing it in the mold, it is secured to the surface of the curing bag 10 before the curing bag itself is vulcanized, by conventional techniques. Thus, the continuous, normally smooth undersurface of the flange 36 and the two discs 39 and 40 respectively is roughened by abrasion. The tube is then cemented on its roughened undersurface to the surface of the curing bag with a vulcanizable cement, and when the curing bag is vulcanized, the tube is integrally united with the curing bag.

Because of the high pressures to which the drain tube is subjected during vulcanizing, and because of the high temperatures, it is essential that the walls 34 of the drain tube 20 be sufficiently strong to resist collapse. This is ordinarily accomplished merely by making the walls 34 sufficiently thick to provide the required strength. However, additional resistance to collapse may be provided simply by inserting a coil spring (not shown) through the tube inlet. Such a spring should have a length coinciding with the length of the passageway 21 in the tube, and should not offer undue resistance to flexing, so that the tube may be bent as desired to conform to the shape of the inner surface of the curing bag.

Positioning of the drain tube 20 on the surface of the curing bag is facilitated if a small guide ring 41 (Fig. 2) is extended around the outlet opening 29 of the tube for insertion within a corresponding aperture in the rim wall 12 of the curing bag. This insures rapid and easy positioning of the drain tube with respect to the discharge stem, and also insures that the drain tube outlet opening 29 is axially aligned with the bore 27 of the discharge valve stem 26. At the inlet end of the drain tube, the channel 31 is located along the bottom of the curing bag, in circumferential alignment therewith, and is so positioned as to occupy the lowermost position in the curing bag during ordinary usage of the bag.

While conventional recapping operations use only compressed air for inflation of the curing bag, and steam for heating the vulcanizing mold, with the improved curing bag and drain assembly of this invention it is possible to employ a combination of steam and compressed air, sequentially, to inflate the curing bag. After the curing bag has been inserted in the tire, and after the rim has been inserted in the tire against the rim wall of the curing bag, the tire is placed in the mold as is conventional. The mold is generally warm from the previous operation, and steam may be admitted immediately to the mold if it has been cut off. Steam at a pressure of 65 to 75 p. s. i. is normally available in a recapping shop, and is injected into the curing bag. This pressure is maintained for a period of from about four to about six minutes. After about six minutes, an air valve may be opened to admit compressed air at approximately 140 pounds p. s. i. into the curing bag. Both the steam line and the compressed air line (not shown) may be hooked up directly to a single inlet valve (not shown) for the curing bag, with a check valve being provided in the steam line to prevent the entrance of air into the steam line. Ordinarily, the cure may be accomplished in twenty-five to thirty minutes under these conditions.

This process offers several advantages. The steam has a beneficial effect on the curing bag, clearly observable in the extended life of the curing bag. In addition, the steam heats the curing bag and tire internally with great rapidity. The rapidity of heat transfer is many times greater than that obtained when heated compressed air is employed. This decreases cycle time and improves the efficiency of usage of the mold.

With a conventional curing bag, having a single inlet for both the introduction and discharge of compressed fluid, the use of steam would be impossible. Water condensing from the steam tends to form small puddles of water in the bag, retarding heat exchange at that point and causing imperfect curing, and presenting a safety hazard when the pressure is released. With the improved curing bag of this invention, any condensation in the curing bag collects in the bottom of the bag and is admitted through the channel 31 into the inlet opening 30 of the drain 20. Thence, the steam pressure forces the condensate outwardly through the drain tube and discharge stem, and into a steam trap (not shown). For convenient control of the recapping process, the steam trap may be discharged into a transparent container, so that the operator may observe the liquid discharge during the recapping process.

The fluid inlet tube 20' may be quite similar in construction to the drain tube 20, with the exception that the discharge outlet 23' is transverse to the length of the tube and is simply a termination of the passageway 21' through the tube. As shown in Fig. 1, the discharge outlet 23' faces away from the drain tube 20, so that good circulation of the pressurized fluid through the curing bag is assured, and so that condensate collecting and discharging at the channel 31 in the drain tube 20 is undisturbed. In the process just described, discharge of any condensate continues even after air has been admitted to the curing bag.

Another improved feature of the curing bag of this invention is the provision of the pair of valve stems 14 and 26 respectively, with different lengths. Thus, the inlet valve stem 14 is of greater length than the discharge valve stem 26. With tires of small diameter, difficulty is frequently experienced in inserting the metal recapping rim in the tire where more than a single aperture is present in the rim for the passage therethrough of a valve stem. With valve stems of different lengths, as in the curing bag of this invention, the longer of the two valve stems is inserted in the rim first. The rim section is then employed as a lever to move the longer stem arcuately out of its normal position, so as to spread the two stems apart. This facilitates the insertion of the shorter stem through its aperture in the rim. In addition, the lengths of the valve stems serve as an identification means. The longer stem identifies the inlet valve stem, and the shorter stem identifies the discharge line.

The specific description of one embodiment of the invention set forth above contemplates the use of the improved curing bag of the invention in connection with recapping and retreading. It will be understood, however, that the improved curing bag of this invention, with its improved draining means, may be employed for expanding and inflating rubber tires in vulcanizing molds of many types and for many purposes.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A drain device for a curing bag having inlet and outlet stems, comprising an elongated pliable body member having an opening extending therethrough and a longitudinally extending planar face at one side thereof, said body member having a groove adjacent one end thereof in said planar face communicating with said opening and disposed transversely of said opening and open at opposite ends, whereby said drain device when disposed in a curing bag with said planar face secured to the inside of said bag, serves to remove liquid accumulated in said bag when said groove is positioned with the ends thereof at the lowest interior portion of said bag.

2. For a toroidal air bag that is made of rubber-like pliable material having a hollow outlet stem secured to and extending through one wall, a drain device comprising an elongated pliable body member having a planar face at one side thereof, said face being of substantial extent both longitudinally and transversely to contact the bag over a large area, said body member having web portions at its ends, said face being adapted to be engaged against and sealed to a confronting portion of the inner surface of said air bag, said body member being formed with a longitudinal bore having angular portions at its ends communicating through said face, said member having at one end a groove in said planar face communicating with one end of said bore and transversely disposed of said bore and open at its ends to communicate through said ends with the interior of said air bag, said member being adapted to be disposed in said bag with its bore at one end communicating with the bore of said outlet stem and at its opposite end with the ends of said groove disposed at the lowest portion of said bag in the normal use position of said bag.

3. A drain device as in claim 2 and having a nipple projecting beyond said planar face and communicating with the other end of said bore.

4. A hollow, toroidal inflatable air bag made of a pliable material having a hollow outlet stem secured to and extending through one wall thereof in a direction radial of the axis of said toroid, said bag being adapted to be inserted in a tire to be inflated to press the tire into a curing mold, said bag having a drain device for removing fluid and condensed water comprising a pliable member that is formed with a substantially smoothed planar face at one side, said face being of substantial extent both longitudinally and transversely and contacting said bag and sealed to a confronting portion of the inner surface of said bag, said member having a longitudinally extending bore having its ends angularly curved and communicating through said face, said member having adjacent one end a groove in said face, communicating with one end of said bore and disposed transversely of said bore and open at its ends and communicating through its ends with the interior of said air bag, said member being disposed in said bag with the ends of said groove disposed at the lowest portion of said bag in normal use position of said bag, and having the other end of said bore communicating with the bore of said outlet stem, whereby liquid is removed from said bag which accumulates in the lowest portion of said bag when in use position.

5. A hollow, toroidal inflatable air bag as in claim 4 and wherein said drain device has a nipple projecting beyond said planar face and communicating with the other end of said bore, a recess on the inside of said bag adjacent the inside opening of said outlet stem, and said nipple being positioned within said recess and communicating with said outlet stem whereby liquid is removed from said bag through said bore, said nipple, and said outlet stem.

References Cited in the file of this patent

UNITED STATES PATENTS

| | | |
|---|---|---|
| 1,213,223 | McLeod | Jan. 23, 1917 |
| 2,341,026 | Eakin | Feb. 4, 1944 |
| 2,530,055 | Green | Nov. 14, 1950 |
| 2,564,662 | Baker | Aug. 21, 1951 |
| 2,673,588 | Eakin | Mar. 30, 1954 |

FOREIGN PATENTS

| | | |
|---|---|---|
| 335,304 | Great Britain | Sept. 25, 1930 |